United States Patent [19]

Moriwake et al.

[11] Patent Number: 5,668,933

[45] Date of Patent: Sep. 16, 1997

[54] IMAGE TRANSFORMATION APPARATUS FOR PRODUCING AN IMAGE COLLAPSING EFFECT

[75] Inventors: Katsuakira Moriwake; Toshihiro Shiraishi, both of Kanagawa, Japan

[73] Assignee: Sony Corporation, Tokyo, Japan

[21] Appl. No.: 224,680

[22] Filed: Apr. 7, 1994

[30] Foreign Application Priority Data

Apr. 17, 1993 [JP] Japan .................. 5-113779

[51] Int. Cl.$^6$ .................................. H04N 5/262
[52] U.S. Cl. .......................... 395/110; 382/276
[58] Field of Search ................. 395/112, 109, 395/106, 110, 118, 119, 127, 133, 138, 139, 170, 172; 348/598, 580; 345/190; 382/276, 282, 284, 286, 291, 293, 294, 295; 358/451, 528, 532

[56] References Cited

U.S. PATENT DOCUMENTS

| | | | |
|---|---|---|---|
| 4,916,540 | 4/1990 | Kosaka | 348/580 |
| 4,965,844 | 10/1990 | Oka et al. | 395/125 |
| 4,985,756 | 1/1991 | Kawabe et al. | 348/580 |
| 5,051,734 | 9/1991 | Laue, Jr. | 345/190 |
| 5,121,210 | 6/1992 | Hirayama | 348/598 |
| 5,361,100 | 11/1994 | Teece | 348/578 |
| 5,408,274 | 4/1995 | Chang et al. | 348/700 |

FOREIGN PATENT DOCUMENTS

| | | |
|---|---|---|
| 0 482 849 | 4/1992 | European Pat. Off. . |
| 2 157 126 | 10/1985 | United Kingdom . |
| 2 200 266 | 7/1988 | United Kingdom . |

*Primary Examiner*—Joseph H. Mancuso
*Assistant Examiner*—Gabriel I. Garcia
*Attorney, Agent, or Firm*—William S. Frommer; Alvin Sinderbrand

[57] ABSTRACT

In an image transformation apparatus for performing image transformation process to a video signal. A sequential read address is transformed based on the function of which a first differential coefficient reduces monotonously in a manner approaching "0" from "1", and the video signal is read out from a storing means by this transformed read address, so as to add an image collapsing effect to the video signal.

8 Claims, 9 Drawing Sheets

IMAGE TRANSFORMATION APPARATUS FOR PRODUCING AN IMAGE COLLAPSING EFFECT

BACKGROUND OF THE INVENTION

1. Field of the Invention

This invention relates to an image transformation apparatus, and more particularly, to a video special effect generating process for rendering a special effect for example to a video signal.

2. Description of the Related Art

Heretofore, an image transformation apparatus is disclosed, for example, in the U.S. Pat. No. 5,070,465. In this type of image transformation apparatus, an input video signal is sequentially written to a predetermined region of a frame memory on the basis of write address output from a write address generation circuit and data in the frame memory is read out by a read address which is input from a read address generation circuit, thereby various special effects are rendered to the video signal so as to display an image in a transformed manner.

None of such image transformation apparatus of the read address controlling type has been adapted to provide a special effect by which a lower portion of a picture frame, for example, collapses as if a pile of sand does.

SUMMARY OF THE INVENTION

In view of the foregoing, an object of this invention is to provide an image transformation apparatus in which it is possible to provide a special effect to an input video signal, a special effect whereby a portion of the image collapses as if a pile of sand trickles.

The foregoing object and other objects of the invention have been achieved by the provision of an image transformation apparatus for performing image transformation process to a video signal, comprising: a storing means for storing an input video signal; a read address generating means for generating a sequential read address; and a transformation means for transforming the read address by a function of which the first differential coefficient reduces monotonously in a manner approaching "0" from "1", thereby supplying the transformed read address means to the storing means as the read address signal of the storing means, and then rendering an image collapsing effect to the video signal.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 3A and 3B to 7 are schematic diagrams for the explanation of the relation between the function used in the image transformation apparatus shown in FIG. 1 and the output picture;

DETAILED DESCRIPTION OF THE EMBODIMENT

Figure 1:
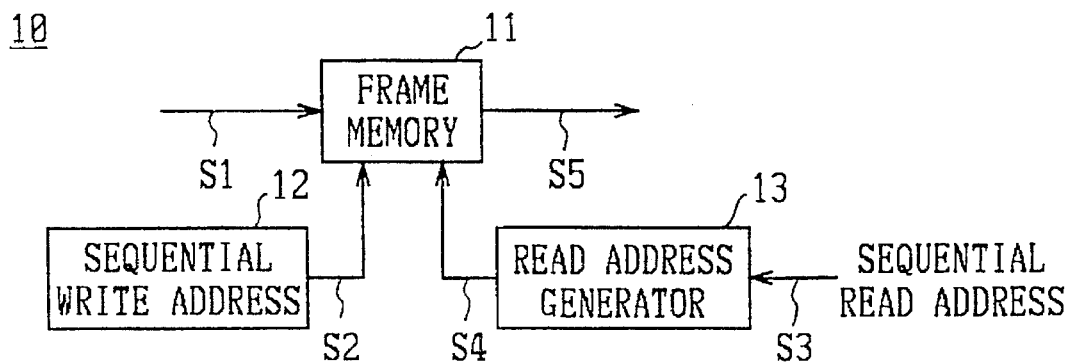
FIG. 1 is a block diagram showing an embodiment of the image transformation apparatus according to the present invention.

Preferred embodiment of this invention will be described with reference to the accompanying drawings:

In FIG. 1, numeral 10 generally denotes an image transformation apparatus, where a digitized input video signal S1 is written to a frame memory 11 without transforming the image, on the basis of a write address signal S2 delivered from a sequential write address counter 12.

Further, a read address generator 13 for generating a read address for reading image data from the frame memory 11 receives a sequential read address signal S3 and processes the sequential read address; and the processed read address is delivered to the frame memory 11 as a read address signal S4, so that an output video signal S5 read from the frame memory 11 forms an image which is obtained as if by adding a predetermined transformation to the input video signal S1.

Figure 2:
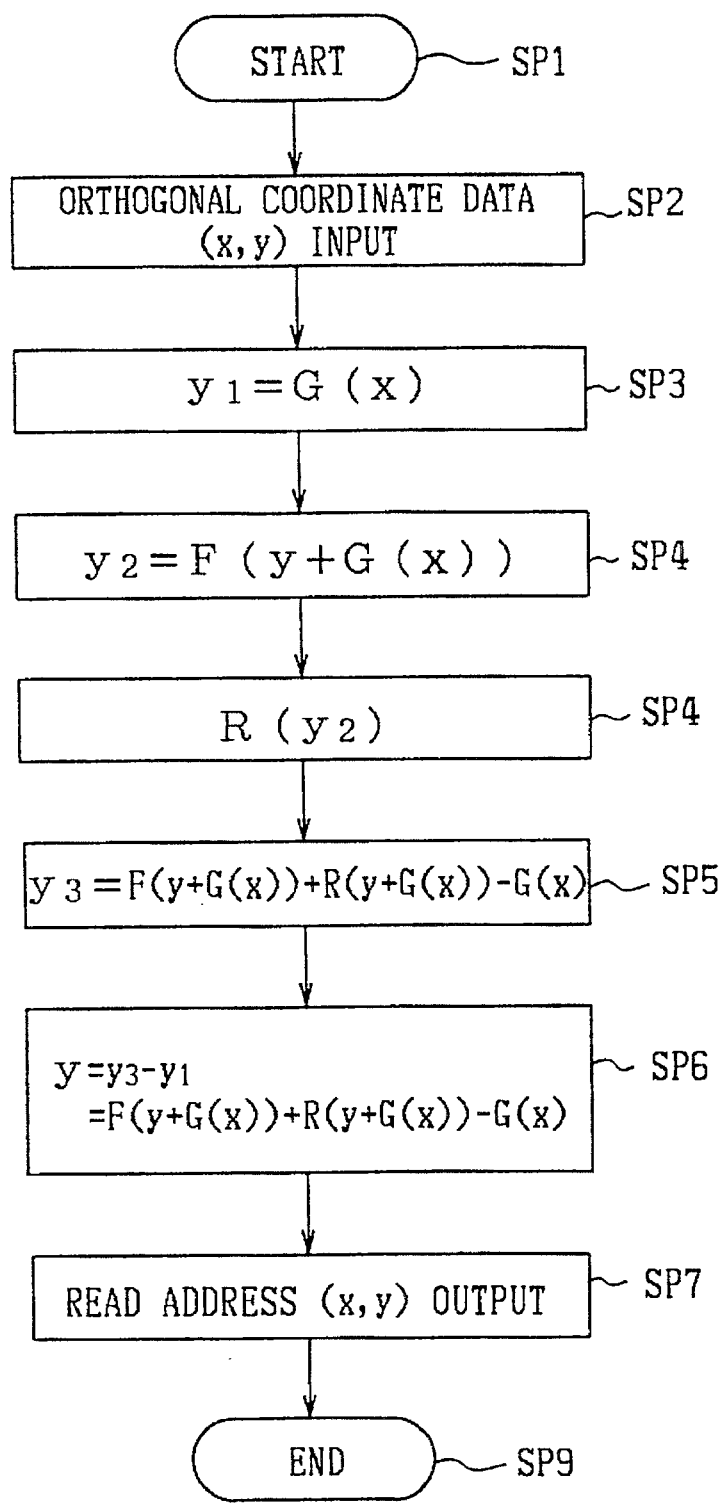
FIG. 2 is a flowchart for the explanation of the operation of the image transformation apparatus shown in FIG. 1.

Here, FIG. 2 shows a procedure for the generation of the read address for the sand collapsing effect in the read address generator 13. Upon entering the procedure from step SP1, the read address generator 13 receives at the next step SP2 a sequential read address which is designated by an orthogonal coordinate system (x, y) based on the read address signal S3 and proceeds to the next step SP3.

Figure 3A:
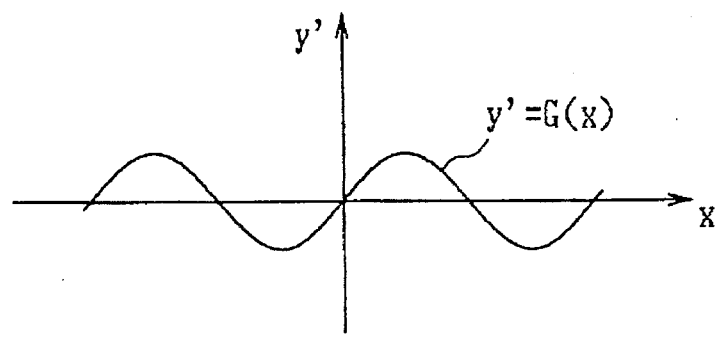
Figure 3A:
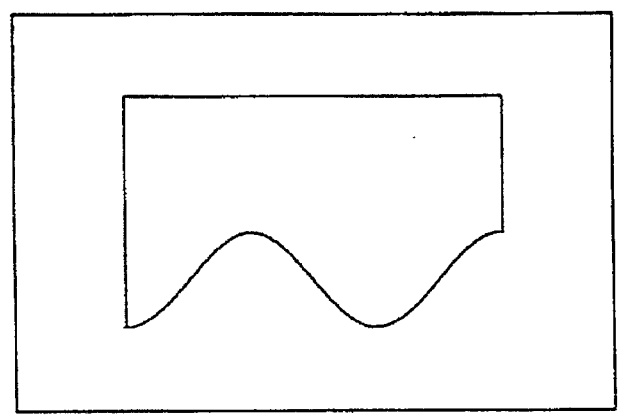
Figure 3B:
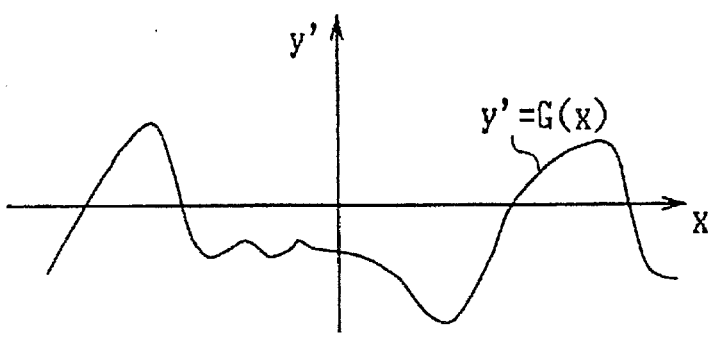
Figure 3B:
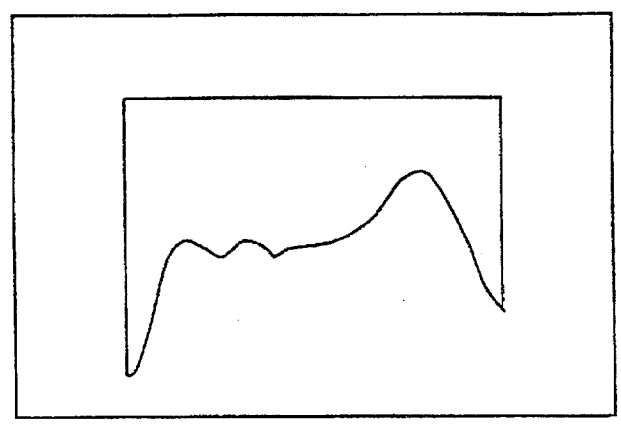

The read address generator 13, at step SP3, computes the shape of the collapse start position by means of a function of $Y_1 = G(x)$. This function is a pattern function as shown in FIGS. 3A and 3B, such as a sine function or a composite function of a sine function and a cosine function.

Further, a periodic function such as:

$$y' = G'(x) = G(x + p(t)), \quad 0 \leq p(t) < \lambda \tag{1}$$

can be used as the function. Provided that $\lambda$ is the wavelength of $G(x)$ and $p(t)$ is a function of time.

Figure 4:
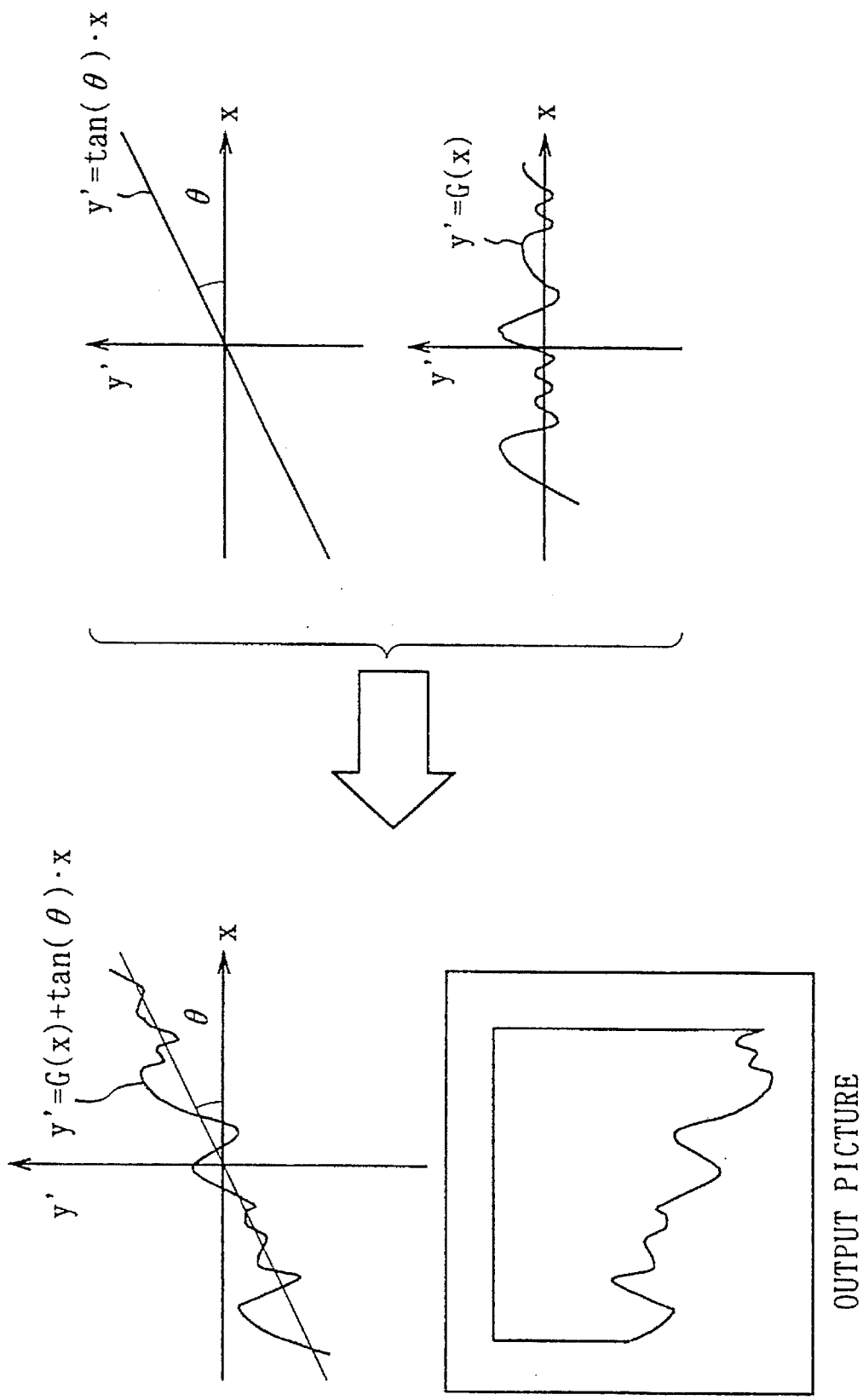

Furthermore, an angle $\theta$ can be provided for the shape of the collapse start position, such case being represented by the equation of:

$$y' = G'(x) = G(x) + \tan(\theta) \cdot x \tag{2}$$

and, as shown in FIG. 4, a collapse start curve y' having an angle $\theta$ is obtained by adding an angle component $\tan(\theta) \cdot x$ to the function $G(x)$. Accordingly, by converting the read address by the collapse start curve y', a collapsing curve inclined by the angle $\theta$ can be represented on the output picture.

Figure 5:
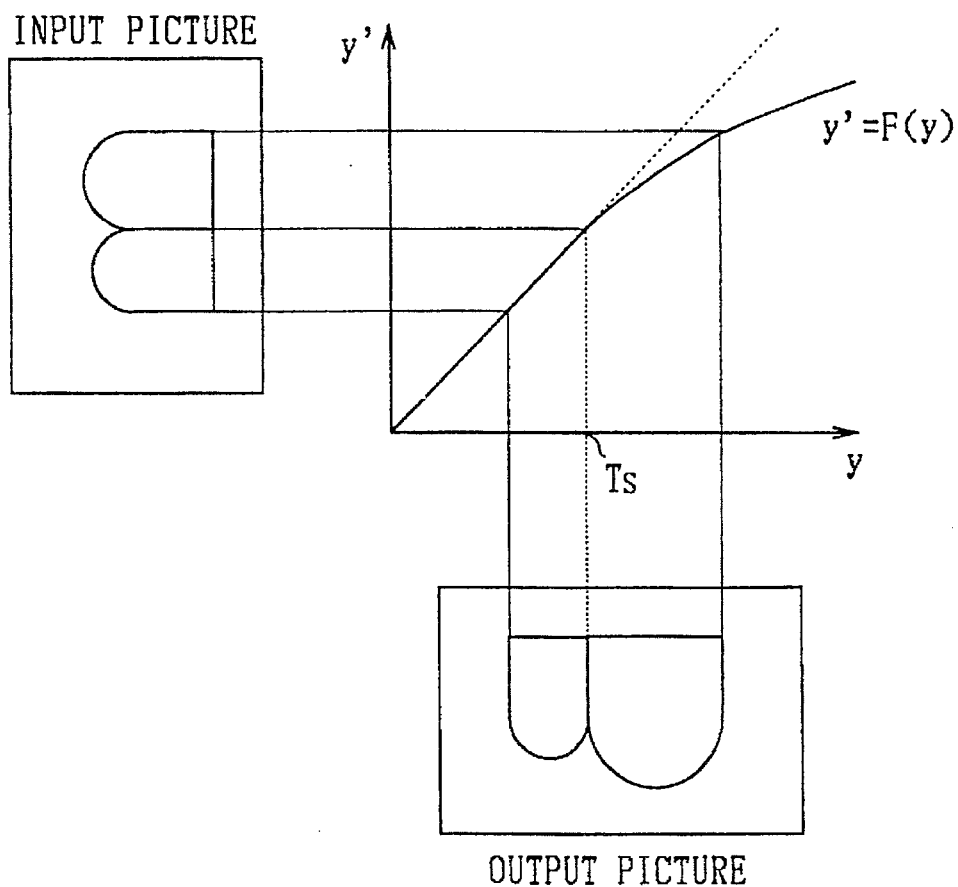

Further, the read address generator 13, at the next step SP4, obtains $Y_2 = F(y + G(x))$. Here, $y' = F(y)$ is a function for regulating the manner of the collapsing and is set so that its first differential coefficient (inclination) is a monotonous decreasing function changing from "1" toward "0" as shown in FIG. 5.

Figure 6:
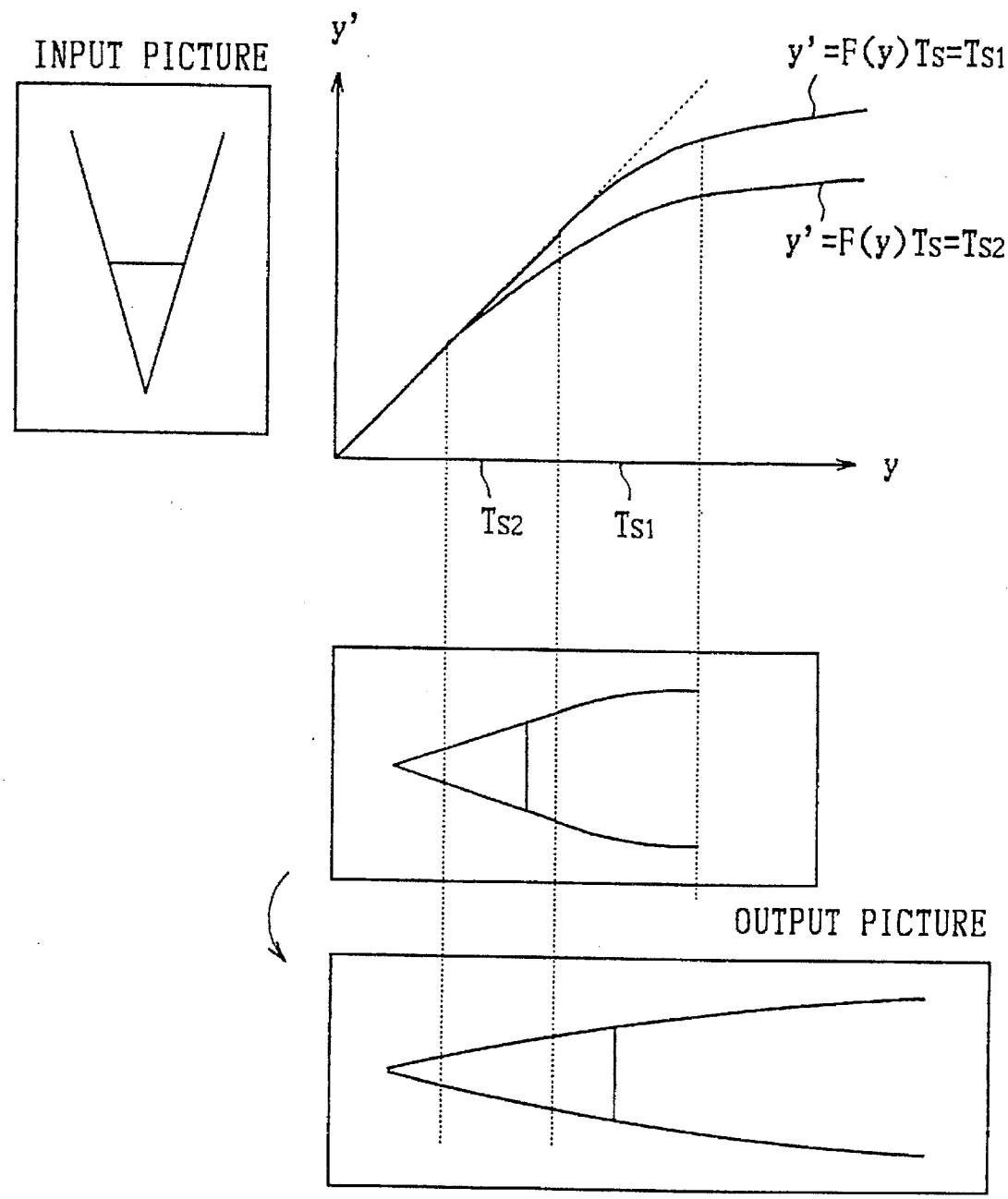
Figure 7:
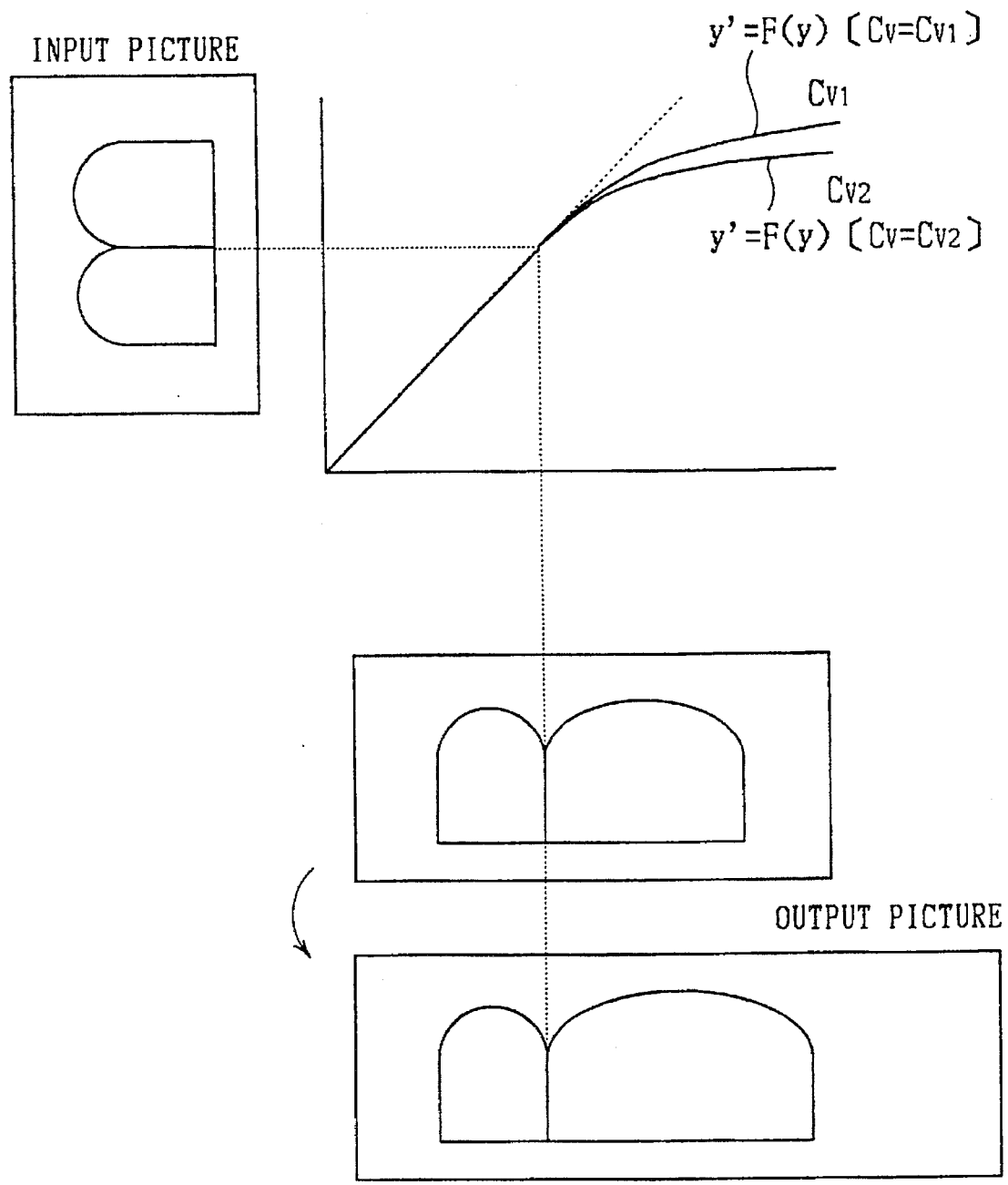

Accordingly, an area is expanded of the output picture corresponding to the area for which the decrease in the inclination occurs beginning at a value of "y", $(T_S)$, at which the inclination starts to change from "1". This changing point $T_S$ becomes the position at which the collapse starts. Accordingly, by varying the position of the changing point $T_S$, the collapse start position of the output picture may be varied as shown in FIG. 6. By varying the degree of decrement $C_V$ of the first differential coefficient as shown in FIG. 7, the degree of the collapsing may be controlled.

Figure 8A:
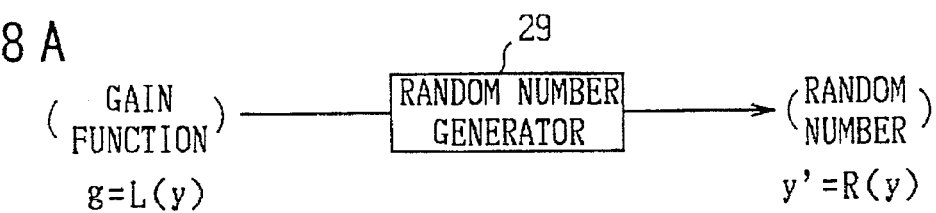
FIGS. 8A to 8C are schematic diagrams for the explanation of the operation of the random number generator in the image transformation apparatus shown in FIG. 1.
Figure 8B:
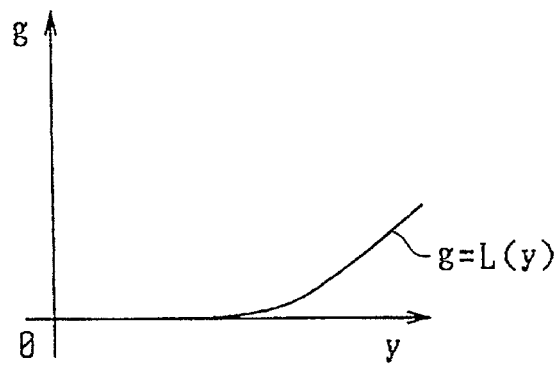
Figure 8C:
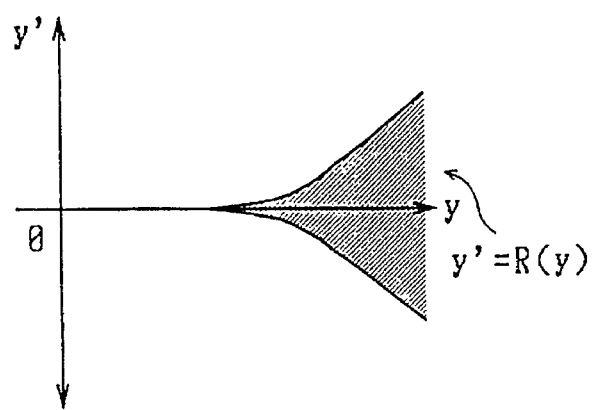

Further, the read address generator 13 proceeds to the next step SP5 where, in order to obtain an effect of simulating a collapse of sand, it computes output random numbers R(y) corresponding to the input gain function L(y) at a random number generator 29 provided within the read address generator 13 as shown in FIG. 8A. The size (absolute value) of the output random numbers of the random number generator is controlled by the gain function to the random number generator. This gain function is linked to the above described function F(y) and is controlled by means of such parameters as the changing point $T_S$, the degree $C_V$ of decrement of the first differential coefficient and an amplification factor $R_P$ of the gain function. Thus it is possible to obtain an effect of collapsing sand which is visually natural.

Figure 9:
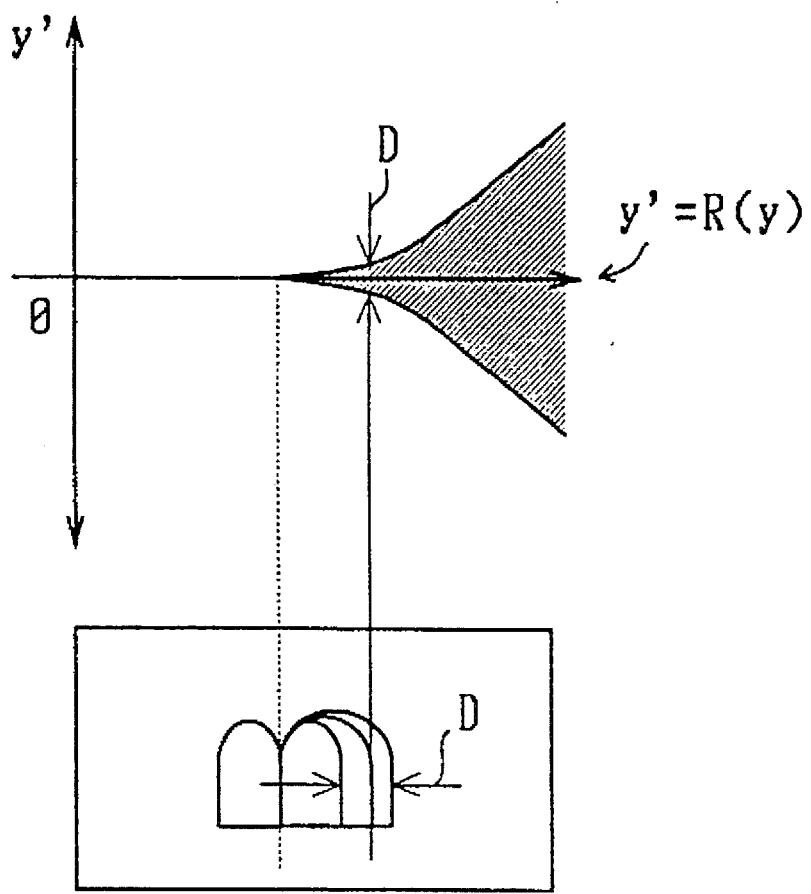
FIG. 9 is a schematic diagram for the explanation of the relation between the random number used in the image transformation apparatus shown in FIG. 1 and the output picture.

Here, the relation between the function R(y) and the output picture is shown in FIG. 9, where the range for which the effect of simulating a collapse of sand is obtained may be designated by the random number width D.

Based on $Y_1$, $Y_2$ and $R(y_2)$ obtained in this manner, the read address generator 13, at step SP5, obtains $Y_3$ and at the next step SP6, in order to keep the collapsing image within the screen, obtains:

$$Y=F(y+G(x))-G(x)+R(y+G(x))) \quad (3)$$

by subtracting the function G(x) from $Y_3$. At step SP7 an output image as if a pile of sand collapses can be obtained by delivering to the memory 11 a read address Y which is derived from the formula (3) and a read address X which is obtained by X=x.

Figure 10:
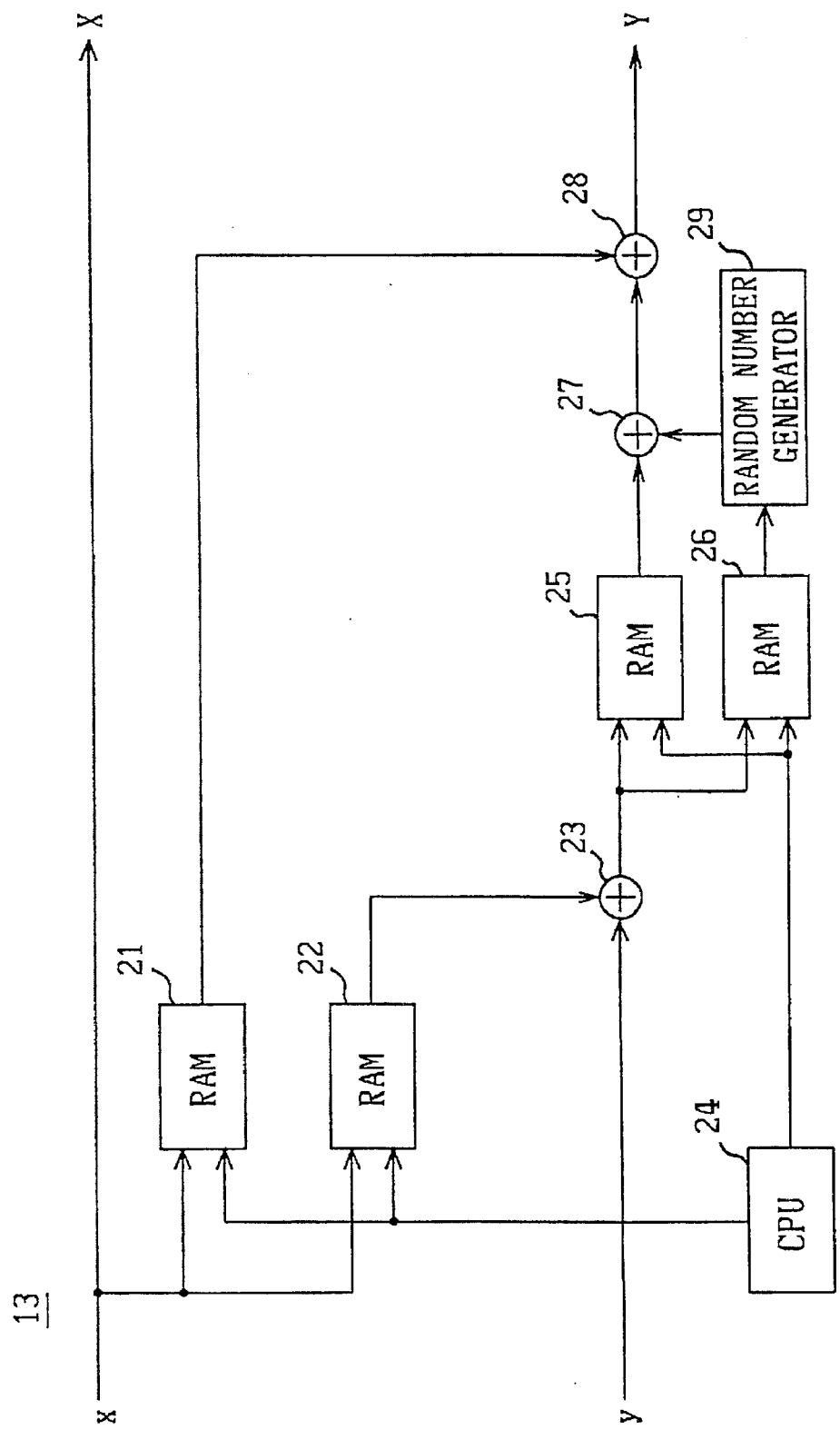
FIG. 10 is a block diagram showing one embodiment of the main part of the image transformation apparatus shown in FIG. 1.

FIG. 10 shows the construction of the read address generator 13 where sequential read address "x" is input to RAMs 21 and 22. Here, the RAM 21 is a table to be looked up by the read address "x" and data to be set to the RAM 21 is y'=−1xG(x) from the above described formula (3).

Further, the RAM 22 is likewise a table to be looked up by the read address "x" and data to be set to the RAM 22 is y'=G(x) from the above described formula (3).

Data are set to these RAMs 21 and 22 by a CPU 24.

Further, the output data of the RAM 22 is added to read address "y" at an adder 23 and such added output is respectively input to RAMs 25 and 26.

The RAM 25 is a table looked up by the added value of the read address "y" and the output data of the RAM 22, data to be set to the RAM 25 being y'=F(y) from the above described formula (3).

Further, the RAM 26 is likewise a table looked up by the added value of the read address "y" and the output data of the RAM 22, data to be set to the RAM 26 being y'=R(y) from the above described formula (3).

Data are set to these RAMs 25 and 26 by the CPU 24.

Furthermore, the output data of the RAM 26 is input to the random number generator 29; the data output from the random number generator 29 based on the output data of the RAM 26 is added to the output data of the RAM 25 at an adder 27; and then the output data of the RAM 21 is added to it at a subsequent adder 28 to obtain a read address "Y" as described above with respect to the equation (3).

Here, the read address "x" input to the read address generator 13 is output as read address "X" as it is.

According to the above construction, by adding the random number generator 29 to the read address generator 13, it is possible to obtain a collapsing effect in which pixels fall in the manner of a scattered sand.

It should be noted that, while, in the above described embodiment, the description has been given with respect to the case where the collapsing effect is obtained on a two-dimensional plane. However, the present invention is not limited to this, but the sequential read address (x, y) to be input to the read address generator 13 may be one which has been processed through a three dimensional matrix.

Specifically, supposing the read address processed through the three dimensional matrix as $x_{3D}$ and $y_{3D}$ and $a_{11}$ to $a_{33}$ as a three dimensional transformation matrix, the read address ($x_{3D}$, $y_{3D}$) represented by:

$$x_{3D} = \frac{\alpha_{11} \times x + \alpha_{12} \times y + \alpha_{13}}{\alpha_{31} \times x + \alpha_{32} \times y + \alpha_{33}} \quad (4)$$

$$y_{3D} = \frac{\alpha_{21} \times x + \alpha_{22} \times y + \alpha_{23}}{\alpha_{31} \times x + \alpha_{32} \times y + \alpha_{33}} \quad (5)$$

may be input to the read address generator 13.

As described above, according to the present invention, it is possible to obtain an image transformation apparatus in which a random number generator is added to the read address generator so as to produce a collapsing effect where pixels fall as if sand is scattered.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An image transformation apparatus for performing an image transformation process on an input video signal, comprising:

storing means for storing said input video signal;

read address generating means for generating a sequential read address (x, y); and transformation means for transforming said read address (x, y) into a transformed read address (X, Y) based on formulas:

X=x

Y=F(y+G(x))−G(x)

indicated by a function F(y) having a first differential coefficient which reduces monotonously in a manner approaching "0" from "1" and a pattern function G(x) representing a collapsing shape, said transformed read address (X, Y) is supplied to said storing means as a read address signal, thereby providing an image collapsing effect to said input video signal.

2. The image transformation apparatus according to claim 1, further comprising:

random number means for generating a random number; and adding means for generating the function to transform said read address by adding said random number to said function.

3. The image transformation apparatus according to claim 2, wherein said random number varies a width of sway of the transformed image.

4. The image transformation apparatus according to claim 1 wherein said transformation means further controls a position in said image corresponding to the transformed read address at which said first differential coefficient of said function F(y) starts to change from "1" to another value.

5. The image transformation apparatus according to claim 1 wherein said transformation means further controls a degree of decrement at which said first differential coefficient of said function F(y) reduces monotonously.

6. An image transformation apparatus for performing an image transformation process on an input video signal, comprising:

storing means for storing said input video signal;

read address generating means for generating a sequential read address (x, y); and transformation means for transforming said read address (x, y) into a transformed read address (X, Y), based on a formula:

$$Y=F(y+G(x))-G(x)+R(y+G(x))$$

indicated by a function F(y) having a first differential coefficient which reduces monotonously in a manner approaching "0" from "1", a pattern function G(x) representing a collapsing shape, and a random number value R(y) corresponding to a "y" component of said read address, said transformed read address (X, Y) is supplied to said storing means as a read address signal, thereby providing an image collapsing effect to said input video signal.

7. The image transformation apparatus according to claim 1 or 6, wherein said pattern function G(x) is a time function.

8. The image transforation apparatus according to claim 1 or 6, wherein said pattern function G(x) is a sine or cosine function.

* * * * *